(12) United States Patent
Maekawa (10) Patent No.: US 8,057,043 B2
(45) Date of Patent: Nov. 15, 2011

(54) IMAGING ELEMENT AND DISPLAY WITH MICRO MIRROR ARRAY

(75) Inventor: Satoshi Maekawa, Tokyo (JP)

(73) Assignee: National Institute of Information and Communications Technology, Koganei-shi (JP)

(*) Notice: Subject to any disclaimer, the term of this patent is extended or adjusted under 35 U.S.C. 154(b) by 466 days.

(21) Appl. No.: 12/293,653

(22) PCT Filed: Mar. 22, 2007

(86) PCT No.: PCT/JP2007/055910
§ 371 (c)(1),
(2), (4) Date: Sep. 19, 2008

(87) PCT Pub. No.: WO2007/116639
PCT Pub. Date: Oct. 18, 2007

(65) Prior Publication Data
US 2010/0231860 A1   Sep. 16, 2010

(30) Foreign Application Priority Data
Mar. 23, 2006 (JP) ................. 2006-080009

(51) Int. Cl.
G03B 21/00 (2006.01)
G03B 21/22 (2006.01)
G03B 21/28 (2006.01)
G02B 5/08 (2006.01)
G02B 27/22 (2006.01)

(52) U.S. Cl. ............. 353/10; 353/71; 353/99; 359/850; 359/462

(58) Field of Classification Search ............ 353/10, 353/71, 99; 359/850, 462
See application file for complete search history.

(56) References Cited

U.S. PATENT DOCUMENTS

| 3,807,849 A * | 4/1974 | Lobb ................. 353/98 |
| 5,861,993 A * | 1/1999 | Shanks et al. ............ 359/629 |
| 5,982,562 A | 11/1999 | Rode |
| 2004/0263964 A1 | 12/2004 | Okano et al. |

(Continued)

FOREIGN PATENT DOCUMENTS

JP   63-191182 A   8/1988

(Continued)

OTHER PUBLICATIONS

Supplementary European Search Report dated Mar. 29, 2010, issued in corresponding European Patent Application No. 07739353.

(Continued)

*Primary Examiner* — Georgia Y Epps
*Assistant Examiner* — Magda Cruz
(74) *Attorney, Agent, or Firm* — Westerman, Hattori, Daniels & Adrian, LLP (57) ABSTRACT

As optical elements for bending a light beam when it passes through an element face constituting one plane, a plurality of unit optical elements for reflecting light on one or more mirror surfaces arranged perpendicularly or at an angle nearly perpendicular to the element face are disposed to constitute an optical imaging element. Light emitted from projection object disposed on one side of the element face is reflected on the mirror surface when it passes through the element face so that a real image is formed in a space on the other side of the element face where a physical entity does not exist, thus constituting a display equipped with the optical imaging element. An aerial picture projection system not existing heretofore is also provided.

22 Claims, 8 Drawing Sheets

U.S. PATENT DOCUMENTS

| | | |
|---|---|---|
| 2005/0185276 A1 | 8/2005 | Tomisawa et al. |
| 2005/0185306 A1 | 8/2005 | Bavdaz et al. |
| 2006/0170616 A1 | 8/2006 | Hirayama et al. |

FOREIGN PATENT DOCUMENTS

| | | |
|---|---|---|
| JP | 09-005503 A | 1/1997 |
| JP | 2004-40722 A | 2/2004 |
| JP | 2004-040722 A | 2/2004 |
| JP | 2005-10755 A | 1/2005 |
| JP | 2005-234240 A | 9/2005 |
| KR | 94-702280 A | 7/1994 |
| WO | 02/086557 A2 | 10/2002 |

OTHER PUBLICATIONS

Chinese Office Action dated Jul. 2, 2010, issued in corresponding Chinese Patent Application No. 200880009991.

Motoaki Kawazu et al., "Imaging device using a roof mirror lens array"; Applied Optics; vol. 24; No. 24; Dec. 15, 1985.

International Search Report of PCT/JP2007/055910, date of mailing Jun. 19, 2007.

Japanese Office Action dated Sep. 12, 2011, issued in corresponding Japanese Patent Application No. 2008-509717.

Japanese Office Action dated Jun. 14, 2011, issued in corresponding Japanese Patent Application 2008-509717.

\* cited by examiner

IMAGING ELEMENT AND DISPLAY WITH MICRO MIRROR ARRAY

BACKGROUND OF THE INVENTION

1. Field of the Invention

The present invention relates to an optical imaging element, including an optical element that uses a specular reflection by a micromirror, for forming a real image of an object in air on an opposite side of the element; and a display device including such an optical imaging element.

2. Description of the Related Art

Known conventional optical elements for forming an image of a three dimensional or two dimensional actual object, displayed image, or the like as a real image at a position transferred spatially include aspects that use, for example, convex lenses or concave mirrors. However, in order to respond to demands to ensure an appropriate viewing angle, optical elements must have large width dimensions; and on the other hand, it is difficult to use an optical element having a short focal distance due to aberrations and other problems, resulting in a larger depth dimension of the optical system. These considerations unfortunately greatly increase the size of a device that uses the optical element and also result in a larger display device itself. Moreover, it is difficult to completely eliminate aberrations even in the case where the device is enlarged; the spatial position of the real image unfortunately changes when the viewpoint is changed; and the image of the three dimensional actual object distorts.

Recently, to resolve such problems, display devices for floating images using microlens arrays have been developed (for example, see Japanese Published Unexamined Patent Application No. 2005-234240). This technology uses an erect image forming system with unit magnification for a two dimensional image, wherein an optical device, having a size similar to a display surface that displays the two dimensional image, enables a parallel translation of a two dimensional image without distortion. Such technology enables an optical device that is smaller and thinner than a normal lens, which contributes to the compactness of the display device as well. However, a real image of a three dimensional actual object cannot be obtained with this technology.

Therefore, optical elements have been proposed in which each individual optical system included in the erect optical imaging element with unit magnification used by the system recited above is an afocal optical system having an infinite focal distance (for example, see Japanese Published Unexamined Patent Application No. 2005-010755). Such an optical element enables the formation, as a real image, of a specular image of an object, and uses the refracting ability of light by a lens as its basic principle; and therefore this optical element is referred to hereinafter as "refractive real specular image forming element." Forming a real specular image means that the real image of the three dimensional actual object can be formed without distortion. The refractive real specular image forming element is an optical component including an afocal optical system, having a first lens component and a second lens component arranged on the same optical axis and separated by their respective focal distances, wherein the entrance lens surface and the exit lens surface of the afocal optical system are arranged in an array on the same plane. Combinations have been proposed for the first lens component and the second lens component, including configurations having two convex lenses, one or more optical fiber lenses, etc.

SUMMARY OF THE INVENTION

Problem to be Solved by the Invention

However, in the case of a refractive real specular image forming element that uses refraction by a lens, it is necessary to precisely arrange or attach high precision microlenses, which unfortunately results in complicated configurations and higher costs. Moreover, it is necessary to bring rays to a focal point at least once inside the optical element by an action of a lens, and therefore the element cannot be made very thin. Furthermore, the refraction of light is used; and unfortunately therefore, viewing is possible only from directions that are nearly perpendicular to the element surface, and it is difficult to view the image at large angles from directions diagonal to the element surface.

The present invention focuses on such problems, and is directed mainly to use a specular surface having an ability to reflect, and thereby provide: an optical imaging element that uses micromirrors, wherein the optical imaging element enables a simplified configuration, cost reductions, and the fabrication of an extremely thin shape, and wherein the optical imaging element includes an optical element capable of being viewed at an angle to the element surface; and a display device including such an optical imaging element.

Means for Solving the Problem

In other words, an optical imaging element according to the present invention comprises: an optical element for causing a light ray to bend as light passes through an element surface, which is one planar surface; and an arrangement of a plurality of unit optical elements for reflecting light by more than one specular surface arranged at an angle perpendicular, or nearly perpendicular, to the element surface.

According to such a configuration, by appropriately setting the number and arrangement of the specular surfaces of the unit optical element, reflections are performed by each specular surface of the plurality of unit optical elements when light passes through the element surface; and therefore a real image of an actual object or displayed image, arranged in a space on one side of the element surface, can be optically formed in a space on the opposite side thereof. Therefore, in comparison to conventional optical elements requiring a plurality of high precision microlenses, the configuration includes plane mirrors; and therefore it is possible to provide a simplified configuration, cost reductions, and a thickness reduction, as well as enable flexible adaptations to various aspects of use. Furthermore, the specular surfaces are arranged nearly perpendicular to the element surface, and therefore light rays can be bent at sharp angles to the element surface. This ability enables the viewing, of the real image formed, at an angle diagonal to the element surface. Therefore, the object, i.e., the actual object or displayed image arranged in a space on one side of the element surface, may be viewed as an erect image that stands up from the element surface on the opposite side. The specular surfaces may be arranged exactly perpendicular to the element surface; or the specular surfaces may be arranged at an angle, considered as nearly perpendicular, within a few degrees of perpendicular. The real image of the three dimensional image or the two dimensional image, which is imaged via the optical imaging element, is formed in air. Therefore, it is possible to use hands, fingers, etc. to touch or indicate by pointing; and viewing is possible from a direction diagonal to the element surface. Thus, it is possible to provide a heretofore unseen and novel method for viewing floating images that float in air above a planar surface. However, the real image of a three dimensional image is formed as an image reversed in the viewing direction, with an inverted depth. Therefore, countermeasures are necessary, such as two passes through the optical imaging element in the case of a real image, or inverting the depth in advance in the case of a synthesized three dimensional image.

As long as the unit optical element of the optical imaging element includes more than one specular surface, there is no particular limitation on the number of specular surfaces. It is possible to change the number of reflections of light according to the number of specular surfaces. However, the imaging pattern varies with the number and the arrangement of the specular surfaces. In the case where one specular surface is used and all of the unit optical elements are arranged in a parallel fashion, both a real image and a virtual image are formed on both sides of the element. Additionally, a favorable configuration of the unit optical element, for easily obtaining a real image, includes two specular surfaces. A unit optical element configuration that has two non-parallel specular surfaces is effective for reflecting light, which passes through the unit optical element and is reflected once by each of the two specular surfaces, to thereby form an image on the opposite side of the element surface. Particularly in the case where the two specular surfaces are orthogonal to each other and function as a dihedral corner reflector, the configuration becomes a reflective real specular image forming element, capable of forming a real image of the specular image. However, in the case where the two specular surfaces are not orthogonal, aberrations occur; and two real images are formed, depending on the specular surface that provides the first out of the two reflections of light.

Regarding the arrangement of the unit optical elements, even in the case where, for example, the dihedral corner reflectors recited above are arranged to point in a plurality of directions within the element surface, the light undergoes a retroreflection with respect to a direction within the element surface, and therefore imaging occurs at the same position, regardless of the orientation of the dihedral corner reflectors. Moreover, in the case where a unit optical element having two specular surfaces that are neither orthogonal nor parallel is used, and in the case where all of the unit optical elements are functionally similar in that the angles between the two specular surfaces are substantially the same for all unit optical elements, the optical imaging position is independent of the orientation even for an arrangement of orientations in a plurality of directions, similarly to the dihedral corner reflectors. In the case of a unit optical element having two non-parallel specular surfaces, types of light exist other than doubly reflected light, such as light transmitted by a single reflection and light transmitted without a reflection. These types of light obstruct the imaging of the light transmitted by a double reflection. Of these types of light, the light transmitted without a reflection passes through in a direction nearly perpendicular to the element surface, and therefore has a low possibility of directly interfering with the doubly reflected light that passes through at an angle. On the other hand, singly reflected light passes through and forms an image at somewhat of an angle, and therefore the possibility of interference is high. To prevent this problem, the unit optical elements may be arranged with any suitable rotation direction around an axis perpendicular to the element surface, thereby avoiding the image formed by single reflections and alleviating the effects thereof. Additionally, in the case where individual unit optical elements point in different directions, the synthesis thereof has an effect of widening the viewing angle. Conversely, manufacturing becomes difficult and the transmittance of light through the optical imaging element decreases. Therefore, in the case where these disadvantages become problematic, it is better to arrange all of the unit optical elements to point in a similar direction.

To allow light rays to pass through an element surface with appropriate bending by the unit optical element, an interior wall of an optical hole, assumed to lie in a direction to pass completely through the element surface, may be considered as a specular surface of the unit optical element. However, such a unit optical element is a conceptual component, and does not necessarily require the utilization of a shape defined by physical interfaces and the like. The unit optical element may include, for example, the optical holes linked together with mutual dependence.

The configuration of the optical element, stated simply, includes a multiple arrangement of specular surfaces, nearly perpendicular to the element surface, on the element surface. The problematic aspect of the configuration is how to support and secure the specular surface to the element surface. As a more specific method for forming the specular surface, the optical imaging element according to the present invention may include, for example, a substrate for partitioning a predetermined space, wherein one planar surface passing through the substrate is specified as the element surface, and an interior wall of a hole made in the substrate as an optical hole, assumed to lie in a direction to pass completely through the element surface, is used as the specular surface of the unit optical element. The hole made in the substrate needs only to be transparent enough to transmit light, and may, for example, have an interior that is a vacuum or is filled with a transparent gas or liquid. Regarding the shape of the hole as well, the hole may include, on its interior wall, one specular surface, or a plurality of specular surfaces not in the same planar surface, for providing the function of the unit optical element. As long as the light reflected by the specular surface can pass through the hole, any shape is possible, including linked holes or complex shapes with portions removed. For example, aspects such as those having individual and independent specular surfaces that stand together in large numbers on a surface of the substrate may be considered as examples of linked holes made in the substrate.

Alternatively, a tubular body, formed by a solid body such as a transparent glass or resin, may be used as the optical hole of the unit optical element. In the case where individual tubular bodies are formed by solid bodies, these tubular bodies may be adhered to each other to function as a supporting member of the element; or an aspect having a substrate may include the tubular bodies protruding from the surface of the substrate. Regarding the shape of the tubular body, the tubular body may include, on its interior wall, one specular surface, or a plurality of specular surfaces not in the same planar surface, for providing the function of the unit optical element. As long as the light reflected by the specular surface can pass through the tubular body, any shape is possible, including a configuration, referred to as a tubular body, made of linked tubular bodies or complex shapes with portions removed.

A shape of the optical hole, wherein all of the adjacent interior wall surfaces are orthogonal, as in a cube or a rectangular parallelepiped, may be considered. In such a case, the gaps between each of the unit optical elements can be minimized, and thereby highly dense arrangements are possible. Furthermore, in the case where all interior wall surfaces are used as specular surfaces, one hole may include four dihedral corner reflectors that point in different directions, thereby providing an optical imaging element configuration that enables viewing from various directions. However, the existence of parallel and opposing specular surfaces increases the possibility of undesirable multiple reflections.

In the case where a plurality of specular surfaces exists within the unit optical element, some of the transmitted light may undergo multiple reflections, i.e., assumed reflections that occur several times or more. Countermeasures for these multiple reflections include, in the case where two mutually orthogonal specular surfaces are formed on interior walls of the optical hole, a countermeasure of forming the surfaces other than the two specular surfaces as non-specular surfaces, which do not reflect light; a countermeasure of arranging these other surfaces at non-perpendicular angles to the element surface; or a countermeasure of making these other surfaces with curved surfaces, thereby alleviating or eliminating multiply reflected light for which three or more reflections occur. To form a non-specular surface, a configuration may be used in which the surface is covered by a reflection-preventing coating or thin film, or in which the surface roughness is increased to cause diffused reflections.

The existence of a transparent and flat substrate does not obstruct the functions of the optical element, and therefore any appropriate substrate may be used as a supporting member and/or a protective member.

In order to provide a high definition image of the object, it is desirable to arrange a plurality of unit optical elements within the element surface with minimal gaps therebetween. For example, grid-shaped arrangements are effective. Such configurations also provide an advantage of easy manufacturing.

Regarding components that may be used as the specular surface of the unit optical element, regardless of being a solid or liquid, examples include: a component that reflects at a flat surface made of a glossy substance such as a metal or a resin; and a component that provides a reflection or a total internal reflection at a flat interface between transparent media with different refractive indices. In the case where a total internal reflection is used for the specular surface, it is highly likely that the undesirable multiple reflections by the plurality of multiple specular surfaces will exceed the critical angle of the total internal reflection, and therefore it is expected that these undesirable multiple reflections will naturally be suppressed.

Additionally, the specular surface may be formed on a very small portion of the interior wall of the optical hole as long as no functional problems occur; or the configuration may include a plurality of unit specular surfaces arranged in a parallel fashion. Restating the latter aspect in other words, one specular surface may be subdivided into a plurality of unit specular surfaces. In such a case, the unit specular surfaces do not necessarily exist in the same planar surface, and need only to be parallel to each other. Furthermore, aspects are permissible wherein the unit specular surfaces contact each other or are separated. In the case where the optical imaging element of the present invention is configured as a reflective real specular image forming element, a dihedral corner reflector having two orthogonal specular surfaces is necessary, and therefore two orthogonal specular surfaces must be formed on each unit optical element. It is not always necessary for the two orthogonal specular surfaces to contact each other, and it is sufficient for light, passing from one side of the element surface to the other side, to be reflected once by each of the two specular surfaces. Thus, aspects are permissible wherein the two specular surfaces contact each other or are separated.

An optical imaging element such as those recited above may be used to form an image of an object, i.e., an actual object or an image projected by a display device arranged on one side of an element surface, as a real image in a direction opposite to the element surface. Herein, the meaning of "direction opposite to the element surface" includes positions of planar symmetry with respect to the element surface as well as positions without planar symmetry thereto. In particular, an aspect for forming an image of an object at a position on the opposite side, with planar symmetry with respect to the element surface, is realized in the case where the unit optical element includes a dihedral corner reflector. In the case where the two specular surfaces of the dihedral corner reflector are tilted from a direction perpendicular to the element surface, the imaging point shifts from the position of planar symmetry.

Furthermore, a display device according to the present invention includes a main unit, including the optical imaging element recited above, and an object arranged on an underside of the main unit, wherein light emitted by the object is transmitted through the optical imaging element, thereby forming and projecting a real image of the object in a space on an upper side of the main unit. Herein, "object" includes actual objects and displayed images that are displayed on devices for displaying images such as screens or displays. In particular, the formation and the projection of the real image of the object at a position of planar symmetry with respect to the element surface can be favorably realized in the case where the optical imaging element includes the dihedral corner reflector recited above.

According to such a display device, the functional effects provided by the optical imaging element recited above may be obtained, resulting in a new and useful display device. For example, the top plate of a desk may be used as the main unit having the optical imaging element recited above. By providing an object in a space under the top plate by arranging an actual object or a device for displaying images or by projecting a displayed image, an image of the object can be transmitted through the optical imaging element and displayed in the air above the top plate. Additionally, a building structure such as a wall, floor, or ceiling; or equipment such as a partition, single-leaf wooden screen, curtain, screen, etc. may be used as the main unit that includes the optical imaging element. By providing an object in a space on the underside thereof by arranging an actual object or by projecting a displayed image, it is possible to show a displayed image projecting from the wall, partition, etc. into the air. Still furthermore, any actual object may be used as the object; and therefore, a floating image with movement can be created by moving the real object on the backside of the optical imaging element, without using a device for displaying images. Additionally, even in the case where the object is a solid object, an image can be formed without distortion, albeit with an inverted depth in the viewing direction. By using a three dimensional actual object or a three dimensional displayed image with a depth that is inverted in advance, a floating image may be displayed with a normal depth.

Effect of the Invention

As recited above, according to the present invention, it is possible to form a real image in air of a three or two dimensional image of an actual object or a displayed image having three or two dimensions, respectively, and to view the real image at an angle from a direction diagonal to an element surface, while enabling a simplified configuration, cost reductions, and a thickness reduction.

BRIEF DESCRIPTION OF THE DRAWINGS

These objects and other objects and advantages of the present invention will become more apparent upon reading of the following detailed description and the accompanying drawings.

DETAILED DESCRIPTION OF THE PREFERRED EMBODIMENT

Hereinafter, one exemplary embodiment of the present invention is described with reference to the drawings.

Figure 1:
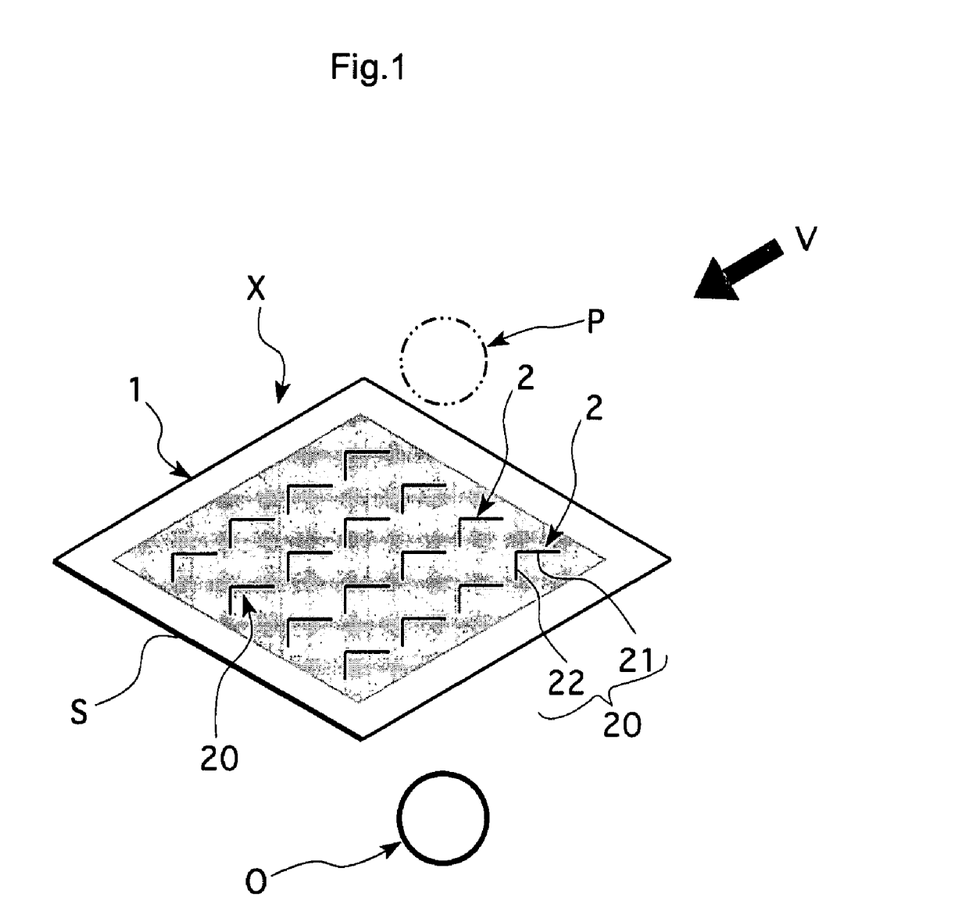
FIG. 1 is a perspective view that schematically illustrates a reflective real specular image forming element according to one exemplary embodiment of an optical imaging element of the present invention.

An optical imaging element X according to this exemplary embodiment functions as a reflective real specular image forming element and arranges, as illustrated in FIG. 1 through FIG. 4, a plurality of unit optical elements 2 including a first interior wall surface and a second interior wall surface made into specular surfaces 21 and 22, respectively, wherein these two interior wall surfaces are orthogonal and pass completely through a substrate 1 in the thickness direction. Hereinafter, the reflective real specular image forming element may be described by adding the reference letter 'X' as necessary. In other words, the reflective real specular image forming element X has a function of forming a specular image P as illustrated in FIG. 1. A real image of an object O, arranged in a space on one side of the element surface S (the underside of the substrate 1 in the illustrated example), is formed as the specular image P at a position of planar symmetry with respect to the element surface S in a space on another side of the element surface S (the upper side of the substrate 1 in the illustrated example), wherein an element surface S is defined as a plane passing through the center of the thickness of the substrate 1 parallel to the surface of the substrate 1. In this exemplary embodiment, a dihedral corner reflector 20, including the two orthogonal specular surfaces 21 and 22, is used as a unit optical element 2. The specular surfaces 21 and 22 are minute in comparison to substrate 1; and therefore the entire collection of the unit optical elements 2 is represented by a gray zone. The orientations of the interior corners of the dihedral corner reflectors 20 are represented by "V" shapes in FIG. 1.

Figure 2:
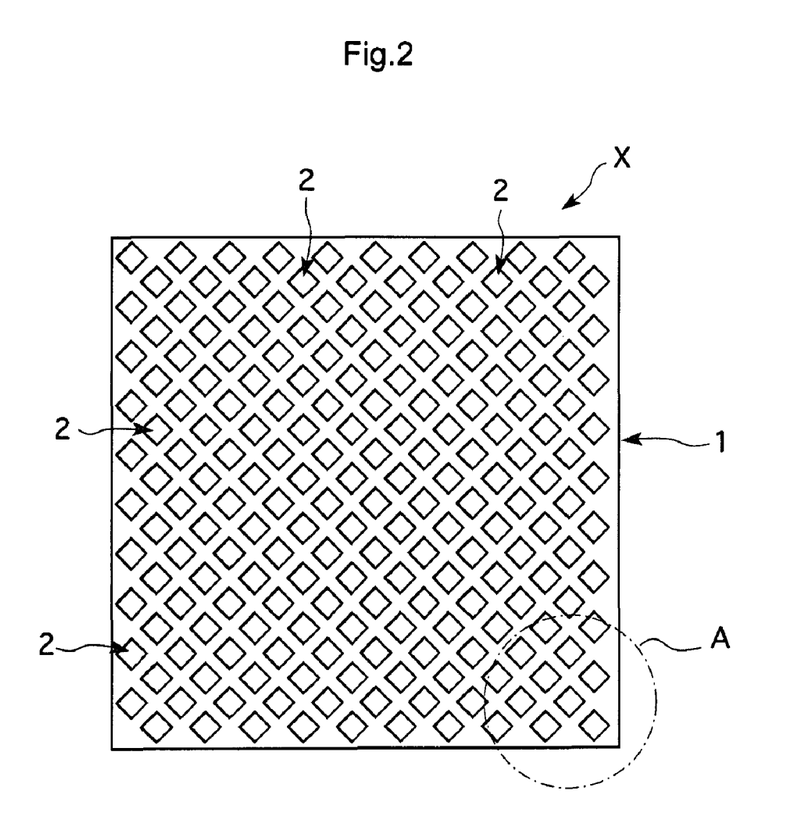
FIG. 2 is a plan view that schematically illustrates the reflective real specular image forming element of the exemplary embodiment.
Figure 3:
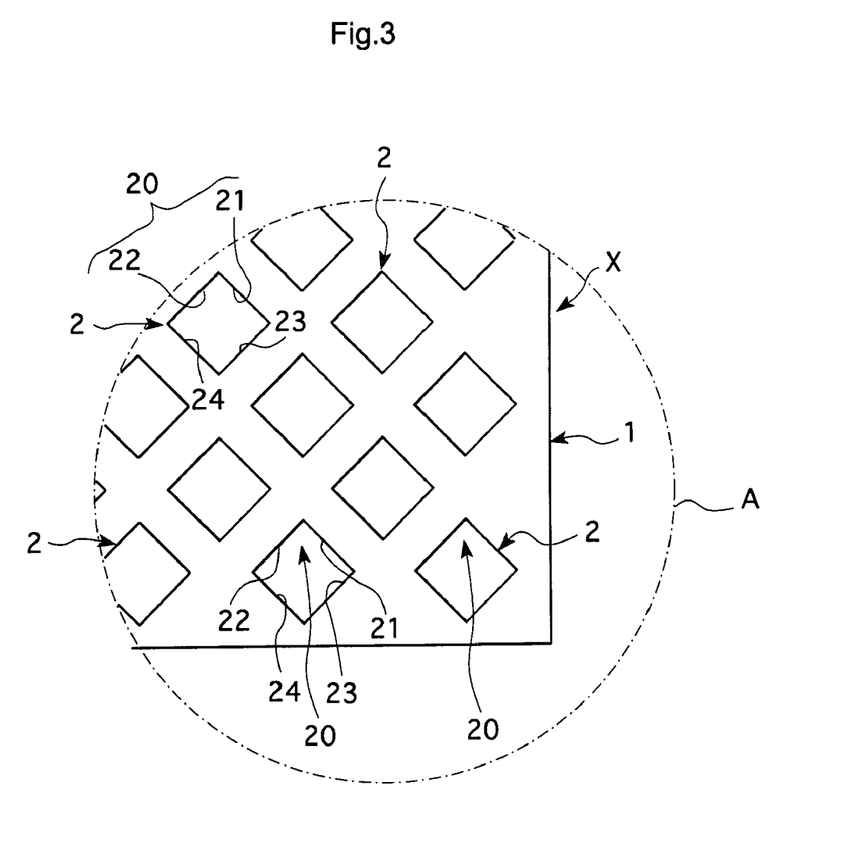
FIG. 3 is a partially enlarged view of the area A of FIG. 1.
Figure 4:
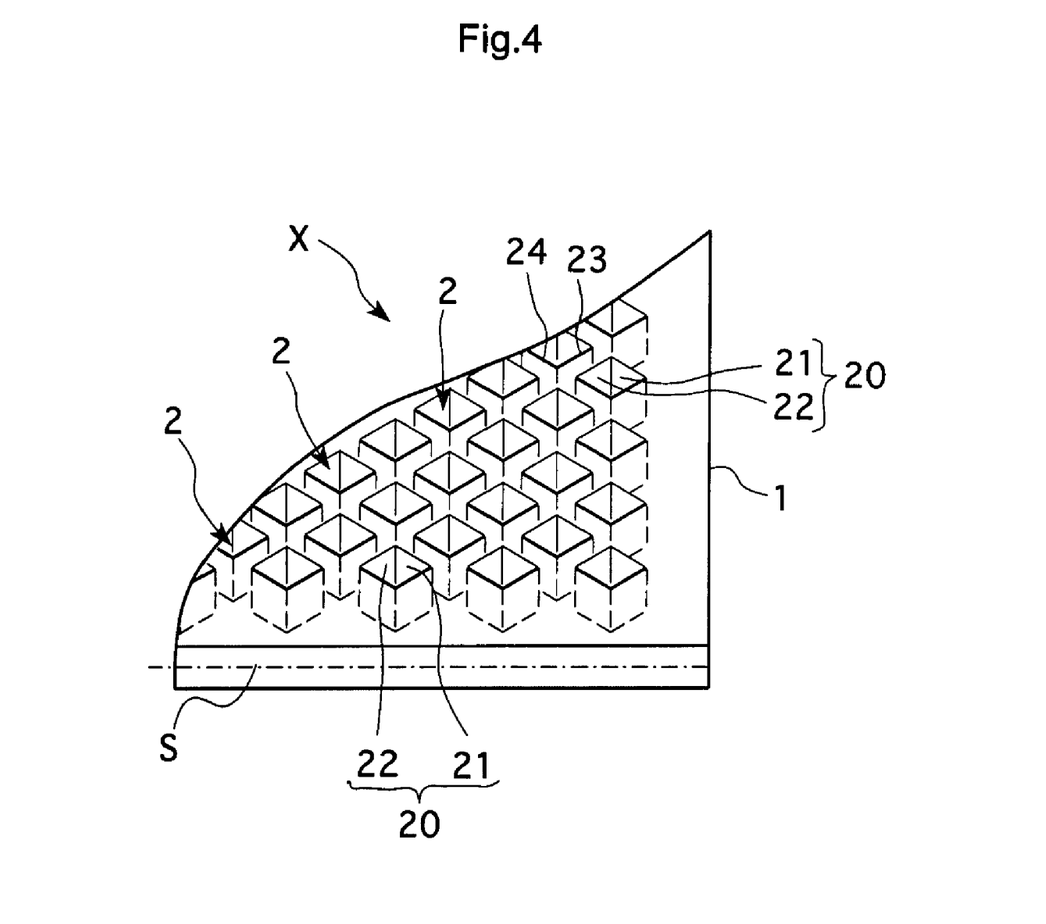
FIG. 4 is an enlarged perspective view of the area A of FIG. 1.

Each unit optical element 2 is a physical and optical hole that transmits light. These holes are minute in comparison to the substrate 1, and therefore FIG. 2 through FIG. 4 illustrate the holes by exaggerated magnification. In this exemplary embodiment, a hole having roughly a rectangular shape when projected onto a plane (specifically, a square shape) is used as the unit optical element 2, which includes the dihedral corner reflector 20, which is made by performing a specular surface processing on the mutually orthogonal first interior wall surface and second interior wall surface, and wherein the first interior wall surface and the second interior wall surface function as reflective surfaces, i.e., the specular surfaces 21 and 22. In the case where a specular surface processing is performed on a third interior wall surface 23 and a fourth interior wall surface 24, four dihedral corner reflectors are formed. Such a configuration enables the viewing of a real image from a plurality of directions, but also results in stray light caused by multiple reflections. To prevent such stray light, the third interior wall surface 23 and the fourth interior wall surface 24 may be non-reflecting surfaces; or the third interior wall surface 23 and the fourth interior wall surface 24 may be formed at angles other than a right angle to the element surface S to avoid being parallel to the specular surfaces 21 and 22 of the first interior wall surface and the second interior wall surface.

In this exemplary embodiment, to enable viewing from the direction of a side of the rectangular substrate 1, each unit optical element 2 is configured such that each side extends in a vertical or horizontal direction and thereby lies at an angle of 45 degrees to the width direction or the depth direction of the substrate 1, and also a configuration with any two different unit optical elements 2 being parallel to each other is made, for easy manufacturing. In other words, the unit optical elements 2 are formed in the substrate 1 such that the interior corner of the two specular surfaces 21 and 22 of the dihedral corner reflector 20 of each unit optical element 2 points in a similar direction. However, orientations at various non-parallel (random) angles are ideal. The reason therefore is that, for angular orientations, (1) singly reflected light diffuses without forming an image and (2) the viewing angle in the horizontal direction of doubly reflected light spreads and thereby results in an averaging of the peaks of the transmittance over the viewing angle. The separating dimension between adjacent unit optical elements 2 is made as small as possible. Furthermore, light shielding processing is performed on portions of the substrate 1 other than the portions in which the unit optical elements 2 are formed. Additionally, a transparent reinforcing member may be arranged on the upper surface and lower surface of the substrate 1 in a thin plate shape (not illustrated). It goes without saying that the unit optical elements 2 are not optically sealed by these plates. As one example in this exemplary embodiment, such unit optical elements 2, numbering between several tens of thousands and several hundreds of thousands, are made in a 5 cm square substrate 1.

Figure 5:
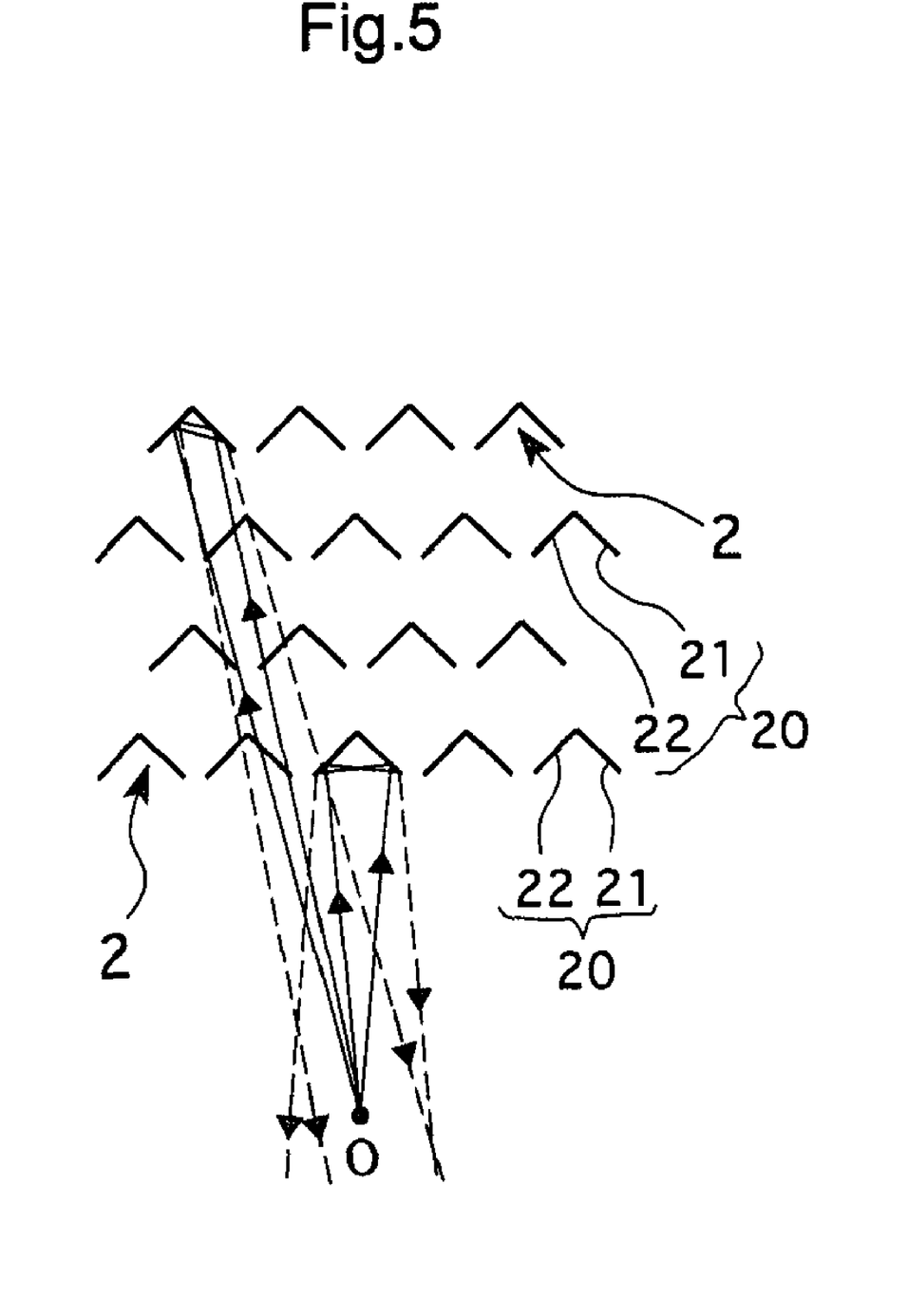
FIG. 5 schematically illustrates an imaging manner of the reflective real specular image forming element.

Thus, the unit optical element 2 formed in the substrate 1 has the following functions: reflecting, by one of the specular surfaces (21 or 22), light that enters the hole of the unit optical element 2 from the upper side (or the underside) of the substrate 1; further reflecting the reflected light by the other one of the specular surfaces (22 or 21) and transmitting the resulting reflected light through to the underside (or the upper side) of the substrate 1. FIG. 5 illustrates the path of the light as projected onto the element surface S. The double reflections of light by the dihedral corner reflector 20 constitute a retroreflection inside the element surface S, and the entrance path and exit path are parallel and pointing in opposite directions. Moreover, components of light that are perpendicular to the element surface S undergo no inversion; and therefore it is obvious that light emitted by a point light source O passes through a position that has nearly planar symmetry with respect to the element surface S. The distance between the mutually parallel entrance path and exit path inside the element surface S is about the size of the aperture of the dihedral corner reflector 20. Rays of light separate to the left or the right depending upon which specular surface the first reflection occurred; and therefore the light emitted by the point light source O spreads, when passing through positions that have planar symmetry with respect to the element surface S, to about the size of the aperture of the dihedral corner reflector 20 multiplied by a factor of two, or in other words, the size of the specular surface (21 or 22) multiplied by a factor of $2\sqrt{2}$ (twice the square root of two) or about a factor of three. Furthermore, the retroreflection by the dihedral corner reflector 20 occurs without dependence on the angle of the incoming light, and light emits from the point light source in all directions. Therefore, the light rays pass through different unit optical elements 2 and all collect at one point, i.e., the rays are brought to a focal point. Thus, a function as a reflective real specular image forming element X is realized by forming multiple unit optical elements 2 having dihedral corner reflectors 20 on the substrate 1 as recited above. In other words, the element surface S of such a reflective real specular image forming element X (as recited above, assumed to be a plane that passes through the center of the thickness of the substrate 1, orthogonal to specular surface components, and illustrated by an imaginary line in the drawings) is the plane that forms the real image of the object O, positioned on one side of the substrate 1, as the specular image P at a position of planar symmetry on the other side. Additionally, the doubly reflected light that passes through the unit optical element 2 focuses on a position of planar symmetry regardless of the distance from the element surface S, and therefore an image of even a three dimensional actual object can be formed as the specular image P without distortion. However, the image is equivalent to how a mirror image would appear if viewed from its backside from a position further inside the mirror, in that the depth is inverted.

Each unit optical element 2 of this exemplary embodiment has a side of, for example, 50 μm to 1000 μm; and this value is favorably 100 μm in this exemplary embodiment. Furthermore, the substrate 1 has a thickness dimension of 50 μm to 1000 μm, and in this exemplary embodiment for example, has a thin flat shape of 100 μm, as illustrated in FIG. 4. One side of the unit optical element is specified as the width of the specular surfaces 21 and 22; the thickness of the substrate is specified as the height of the specular surfaces 21 and 22; and in this exemplary embodiment, the width and the height of the specular surfaces are nearly the same dimension.

The size of the unit optical element 2 specifies the resolution. In terms of geometrical optics as illustrated in FIG. 5, the point light source spreads to about the size of the unit optical element 2 multiplied by a factor of two, and then concentrates. In geometrical optics, when this is made smaller it results in a concentration to a smaller spot but is more susceptible to the effects from diffraction, and therefore the resolution conversely may deteriorate by being too small. Therefore, it is necessary to use an optimal size according to the distance at which light concentrates. For this exemplary embodiment, the size is optimized for a distance of about 1 cm to 2 cm.

Regarding the height of the specular surfaces 21 and 22, i.e., the thickness of the substrate 1 according to this exemplary embodiment, the ratio of the height to the size of the unit optical element 2 specifies the optimum viewing angle. As the thickness becomes larger, the optimum viewing angle becomes more suitable for viewing from a direction more perpendicular to the element surface S; and as the thickness becomes smaller, the reverse occurs. For this exemplary embodiment, the ratio is 1:1, and viewing is optimal from a direction 30 degrees to 40 degrees above horizontal. Regarding the width dimension and depth dimension of the substrate 1, the configuration of the optical imaging element X is uniform; and because no optical axis exists as in the case of a convex lens or a concave mirror, any dimension may be used. As in the case of a plane mirror, the size may be determined according to the size of the actual object to be displayed.

Now, a specific method for manufacturing will be described. According to this exemplary embodiment, tubular bodies are formed in an array on a metal die by nanomachining, and then a smooth specular surface, having a surface roughness of no more than 50 nm, is formed on side faces corresponding to a first interior wall surface and a second interior wall surface. Then, the unit optical elements are made as a plurality of holes with a predetermined pitch in one substrate 1 by using the fabricated die to perform inverted transfer by a nano-imprint method or an electro casting method. In the case where the substrate 1 is formed by an electroforming method using a metal such as aluminum or nickel, and in the case where the surface roughness of the die is sufficiently good, the first interior wall surface and the second interior wall surface thus naturally become the specular surfaces 21 and 22. In the case where a nano-imprint method is used with a substrate 1 made of a resin or the like, it is necessary to form a specular surface coating on the first interior wall surface and the second interior wall surface by sputtering, and the like.

The light passing through the reflective real specular image forming element X includes light such as: direct light, which is reflected by neither of the specular surfaces 21 and 22 of the first interior wall surface and the second interior wall surface of the dihedral corner reflector 20; singly reflected light, which is reflected only once by only one of the two specular surfaces 21 and 22 of the dihedral corner reflector 20; doubly reflected light, which is reflected a total of two times, i.e., once by each of the two specular surfaces 21 and 22 of the dihedral corner reflector 20; and multiply reflected light, which undergoes a total of more than two reflections by the third interior wall surface 23 or the fourth interior wall surface 24 in addition to the two specular surfaces 21 and 22 of the dihedral corner reflector 20. Of these types of light, only the doubly reflected light relates to forming the real image of a specular image.

Types of light other than doubly reflected light have different properties than that of doubly reflected light, and the use of an optical imaging element as the reflective real specular image forming element X may result in such light becoming stray light that causes obstructions. Therefore, countermeasures for light other than doubly reflected light will be described.

First, straight light is viewed within a relatively narrow area around a direction perpendicular to the element surface S of the reflective real specular image forming element X. Therefore, straight light is not very problematic for a real image of a specular image viewed from a viewpoint at an angle in a direction diagonal to the element surface S.

Analysis of the intensity distribution of singly reflected light shows that a maximum exists at a direction that opposes the specular surface 21 or the specular surface 22 and is shifted 45 degrees from the direction of the maximum intensity for the imaging by the dihedral corner reflectors 20. Therefore, this phenomenon is not very problematic for viewpoints in the narrow area. However, singly reflected light forms an image in a different pattern than that of doubly reflected light, and therefore an obstructing image is recognizable as the range of the viewpoints widens. Countermeasures for such problems include rotating each dihedral corner reflector 20 within the element surface S at random.

Moreover, problematic reflections at the opposing face occur for multiply reflected light of three or more reflections; and therefore in the case where the diagonal arrangement recited above is used, the interior wall surfaces (the third interior wall surface 23 and the fourth interior wall surface 24), which oppose the specular surfaces 21 and 22 formed on the first interior wall surface and the second interior wall surface, respectively, may be formed without a specular surface or at non-parallel angles, thereby enabling the avoidance or alleviation of the problem.

Figure 6:
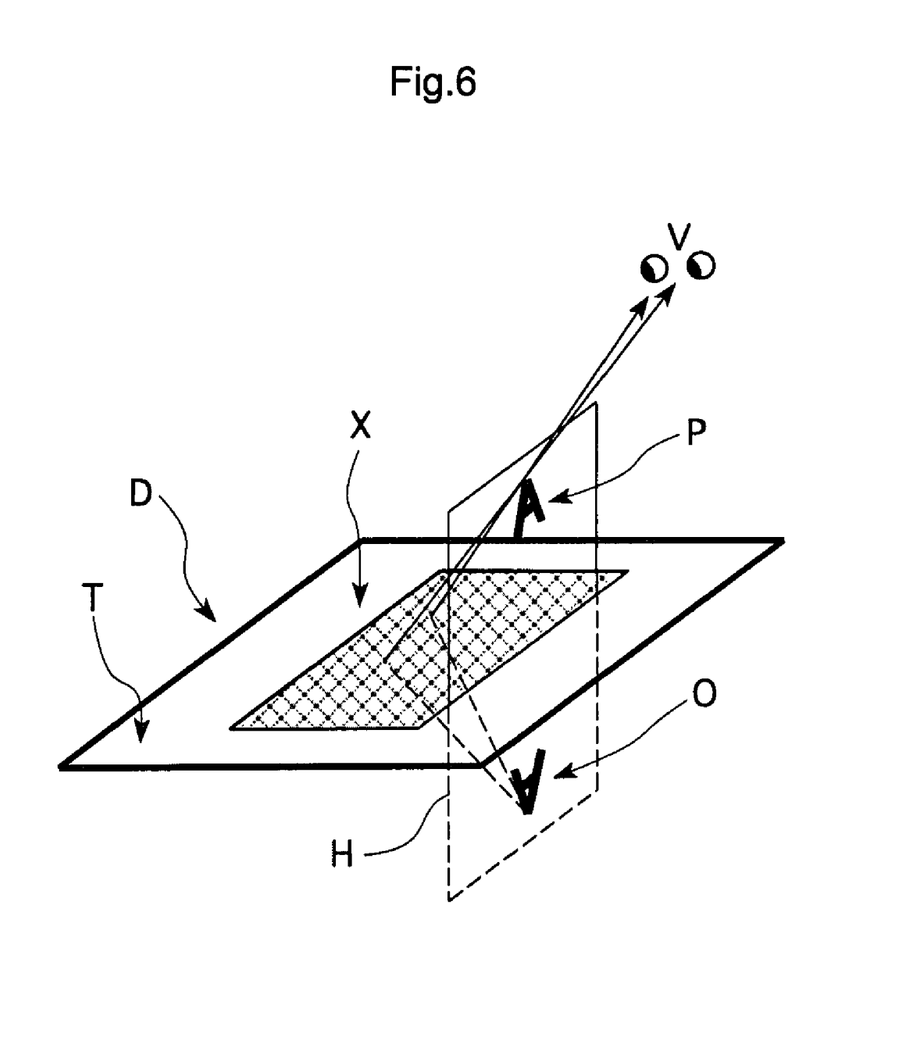
FIG. 6 schematically illustrates a display device including a reflective real specular image forming element according to the exemplary embodiment.

A display device D according to this exemplary embodiment includes one or more reflective real specular image forming elements X that are placed in a horizontal fashion in a main unit, i.e., a top plate T, as illustrated in FIG. 6. The display device D forms, at a position of planar symmetry with respect to the surface direction of the substrate 1 (in particular, with respect to the element surface S), an image of the object O, i.e., a two dimensional or three dimensional actual object displayed or arranged in a space on the underside of the substrate 1. In FIG. 6, a display object H of, for example, a liquid crystal display or other device for displaying images is arranged in a fashion nearly perpendicular to the surface direction of the top plate T in a space below the top plate T as an object O. A character ("A") is displayed on the display object H as an illustration of one aspect.

Figure 7:
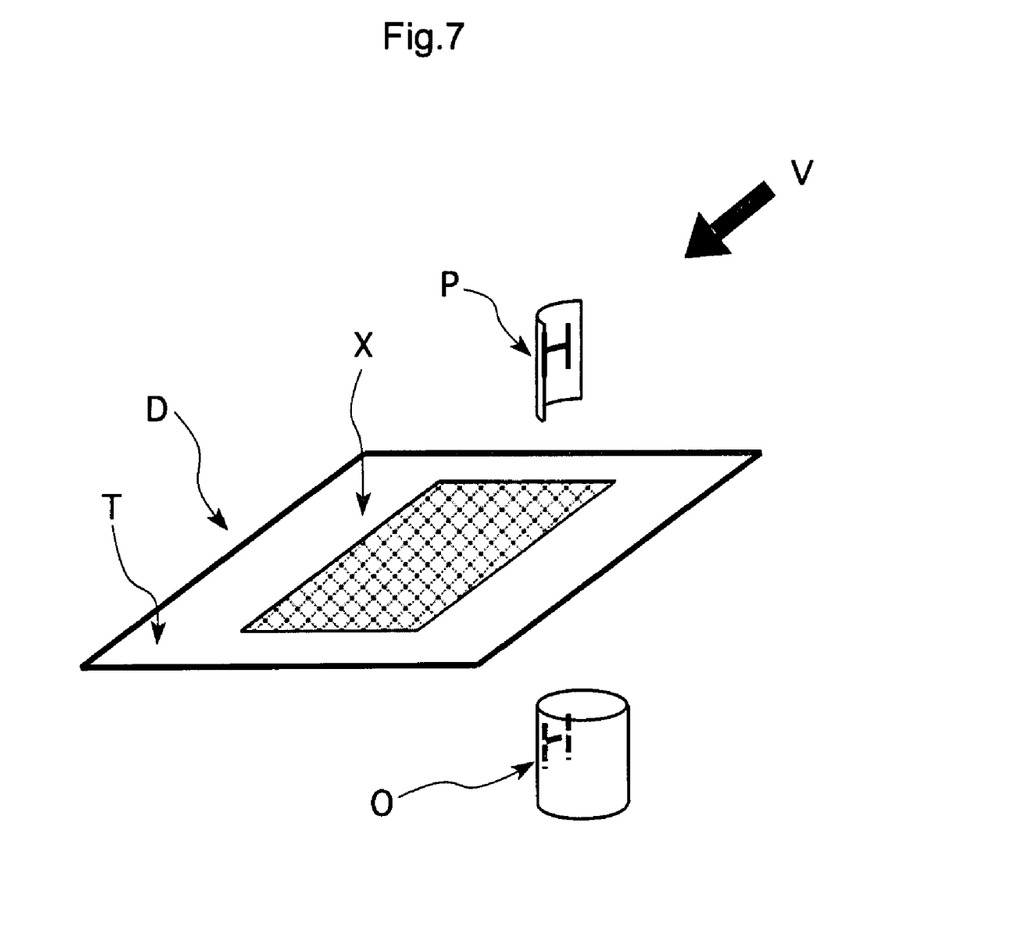
FIG. 7 schematically illustrates a state produced by forming an image with the display device using a solid object as an object.

Now, functions of the display device D will be described. As recited above, the doubly reflected lights that pass through the unit optical elements 2 focus at a position of planar symmetry, and therefore rays can be brought to a focal point in a wide area along the depth direction (perpendicular to the element surface S of the reflective real specular image forming element X). The light emitted by the object O, i.e., the two dimensional image displayed on the display object H under the top plate T, forms an image, i.e., the specular image P, on a virtual display (phantom display) that stands erect above the top plate T (but does not physically exist). Thus, the specular image P may be viewed from a viewpoint V from an angle in a direction diagonal to the element surface S. Additionally, in the case where a three dimensional image such as the cylindrical shape illustrated in FIG. 7 is arranged in the space on the underside of the substrate 1 as an object O, a three dimensional image appears on the upper side of the substrate 1. However, the concavity and convexity of the three dimensional image P in the viewing direction are inverted, and therefore the three dimensional image P appears as if viewed from the interior side of the column. Such an inversion of the concavity and convexity of the object O and the image P may be avoided by reversing in advance, with respect to the element surface S, the concavity and convexity of the three dimensional image arranged in the space on the underside of the substrate 1.

Thus, the optical imaging element according to this exemplary embodiment, namely, the reflective real specular image forming element X, includes a plurality of unit optical elements 2 arranged in the substrate 1, including two interior wall surfaces (the first interior wall surface and the second interior wall surface), which are made into the specular surfaces 21 and 22 of the dihedral corner reflector 20, wherein these interior wall surfaces are orthogonal and pass completely through the substrate 1 in the thickness direction. Therefore, the light, reflected once by each of the specular surfaces 21 and 22 of the two orthogonal interior wall surfaces for a total of two times when passing through each unit optical element 2, passes through a point that has planar symmetry with respect to the element surface S (in other words, the surface direction of the substrate X1). An image of the object O (a two dimensional or three dimensional actual object or displayed image), arranged in the space on one side of the substrate 1 (element surface S), can thereby be formed as a real image of the two dimensional image or the three dimensional image in the space on the other side thereof without distortion. Thus, two dimensional images and three dimensional images can be transferred to a space where no physical entity exists. Moreover, it is possible to use hands, fingers, etc. to touch or indicate by pointing on the virtual three dimensional or two dimensional image formed via the reflective real specular image forming element X. Therefore, new, useful, and heretofore unseen aspects of use can be realized. According to this exemplary embodiment, an optical imaging element may be used as the reflective real specular image forming element X, and therefore, especially in comparison to a conventional refractive real specular image forming element that uses a plurality of microlenses, the real image of the object O can be viewed as the specular image P from an angle in a direction diagonal to the element surface S. Additionally, a simplified configuration, cost reductions, and a thickness reduction are enabled; and therefore flexible adaptations for various aspects of use are possible. In particular, the unit optical element 2 used in this exemplary embodiment includes a hole that passes through the substrate X1 in the thickness direction; and therefore it is possible to change the refractive index by filling the hole with a transparent gas, liquid, or the like.

However, the present invention is not limited to the exemplary embodiment recited above. It is sufficient that simply two orthogonal reflective surfaces exist for the dihedral corner reflector of the reflective real specular image forming element. A phenomenon may be used for the reflective surface, such as a reflection by an end face or a film made of a substance that reflects light, having a flatness of the precision of a specular surface, or by a total internal reflection by an interface between transparent media with different refractive indices, having a flatness of the precision of a specular surface. More specifically, this exemplary embodiment recited above illustrates an example in which the reflective real specular image forming element X includes a square shaped hole, made in a substrate 1 having a thin plate shape, and a dihedral corner reflector 20, formed as the specular surfaces 21 and 22 on two adjacent inner circumferential walls of the hole; but it is also possible, for example, to use a configuration such as that illustrated in FIG. 8, in which a unit optical element 2' includes a transparent tubular body extending in the thickness direction of a substrate 1'; wherein a reflective real specular image forming element X' is formed by a plurality of such tubular bodies arranged in a chessboard fashion. In such a case, each tubular body 2' may include a dihedral corner reflector 20' having specular surfaces 21' and 22' formed on the mutually orthogonal first interior wall surface and second interior wall surface. In such a case, similarly to the exemplary embodiment recited above, light is reflected twice by the dihedral corner reflector 20' and passes through a point having planar symmetry with respect to the surface direction of the substrate 1', namely, an element surface S'; and therefore not only a two dimensional image but also a three dimensional image can be formed in a predetermined space.

Figure 8:
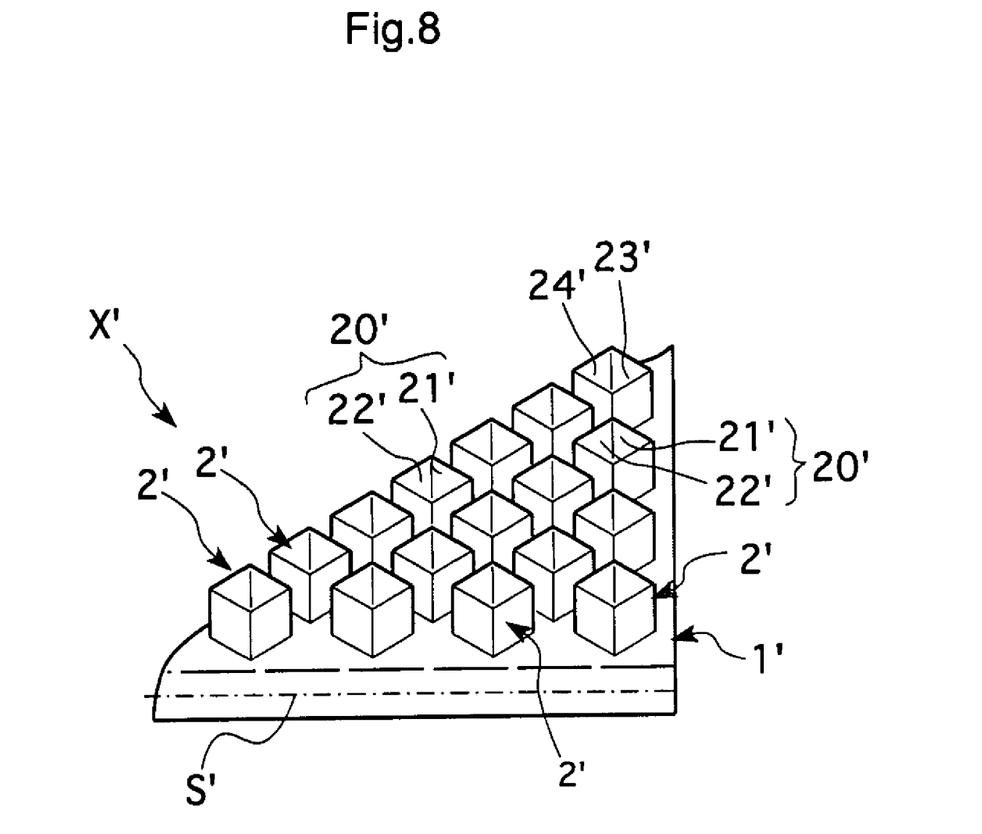
FIG. 8 is a perspective view of a reflective real specular image forming element according to one modification of the exemplary embodiment, illustrated correspondingly to FIG. 2.

Additionally, surfaces of the tubular body other than the specular surfaces 21' and 22', i.e., a third interior wall surface 23' and a fourth interior wall surface 24', may be formed without a specular surface or at an angle other than perpendicular to the element surface S, thereby enabling the elimination of excessive reflections and providing a clearer image. Furthermore, the two specular surfaces 21' and 22' of the dihedral corner reflector 20' may use total internal reflections, or may use a reflection by a reflective film. In particular, in the case where total internal reflections by the specular surfaces 21' and 22' are used, each total internal reflection has a critical angle, and therefore it is expected that multiple reflections may be prevented. Also, the two surfaces of the tubular bodies to be formed with specular surfaces may be affixed with a metal reflective film, and the tubular bodies may be bonded to each other. In such a case, a countermeasure for multiple reflections, such as the formation of non-specular surfaces and the like, must be performed for the surfaces other than the specular surfaces. However, the aperture ratio improves; and therefore it is possible to obtain a reflective real specular image forming element with a high transmittance.

Regarding the two specular surfaces of the dihedral corner reflector, as long as two orthogonal reflective surfaces are formed, the reflective surfaces may not contact each other and may be arranged with a gap therebetween. Moreover, regarding the hole and the tubular body recited above, there is no particular restriction on the angles among the two surfaces functioning as specular surfaces of the dihedral corner reflector and other surfaces. Regarding the unit optical element, the shape projected onto a plane may be a polygonal shape other than a rectangular shape, or a triangular shape; or the surface that connects the edges at the opposite point of intersection of the two specular surfaces may be nearly a partial arc shape when projected onto a plane. In the case where the shape of the unit optical element as projected onto a plane is defined as a right triangle, this means that a right angle prism is used as the unit optical element.

Adaptations to various modes of use are possible by appropriately changing features such as the shape and size of the optical imaging element (including the reflective real specular image forming element) or the thickness dimension, the shape when projected onto a plane, or the raw material of the substrate.

The specific components are not limited to those according to the exemplary embodiment recited above, and various modifications may be made in a scope that does not depart from the spirit of the present invention.

INDUSTRIAL APPLICABILITY

The optical imaging element (including the reflective real specular image forming element) of the present invention includes an optical element having a new ability to form an image, namely, forming an image of an object, arranged on one side of an element surface, as a real image in a space that contains no physical entity, on the other side thereof, wherein the depth direction in the viewing direction is inverted; and therefore uses are possible for devices that display images such as displays, viewing devices for objects of exhibition, and the like.

What is claimed is:

1. An optical imaging element comprising:
   an optical element for causing a light ray to bend as light passes through an element surface, which is one planar surface, and
   an arrangement of a plurality of unit optical elements for reflecting light by at least one specular surface arranged at an angle perpendicular, or nearly perpendicular, to the element surface,
   wherein an interior wall of an optical hole, assumed to lie in a direction to pass completely through the element surface, is used as the specular surface of the unit optical element.

2. The optical imaging element according to claim 1, wherein the unit optical element comprises two non-parallel specular surfaces.

3. The optical imaging element according to claim 2, wherein the plurality of unit optical elements has functionally similar configurations and is arranged to point in a plurality of directions within the element surface.

4. The optical imaging element according to claim 2, wherein the unit optical element functions as a dihedral corner reflector including two orthogonal specular surfaces.

5. The optical imaging element according to claim 4, wherein the dihedral corner reflectors are arranged to point in a plurality of directions within an element surface.

6. The optical imaging element according to claim 4, wherein the dihedral corner reflectors are arranged to point in a similar direction within an element surface.

7. The optical imaging element according to claim 1, wherein the optical holes of the unit optical element are linked together with mutual dependence.

8. The optical imaging element according claim 1,
   further comprising a substrate for partitioning a predetermined space, wherein
   one planar surface passing through the substrate is specified as the element surface, and
   an interior wall of a hole made in the substrate as the optical hole, assumed to lie in a direction to pass completely through the element surface, is used as the specular surface of the unit optical element.

9. The optical imaging element according to claim 8, wherein the unit optical element comprises a hole made in a substrate and filled with a transparent gas or liquid.

10. The optical imaging element according to claim 1, wherein a tubular body, comprising a transparent solid body, is used as an optical hole of the unit optical element, assumed to lie in a direction to pass completely through the element surface.

11. The optical imaging element according to claim 10, wherein the tubular bodies of the unit optical element are mutually adhered to each other.

12. The optical imaging element according to claim 1, wherein the optical hole comprises a cubic or rectangular parallelepiped shape.

13. The optical imaging element according to claim 12, wherein all of four surfaces of interior walls of the optical hole are specular surfaces.

14. The optical imaging element according to claim 1, wherein
   two mutually orthogonal specular surfaces are formed on interior walls of the optical hole, and
   a surface of the interior walls other than the two orthogonal specular surfaces is formed non-perpendicularly to the element surface.

15. The optical imaging element according to claim 1, wherein
   two mutually orthogonal specular surfaces are formed on interior walls of the optical hole, and
   a surface of the interior walls other than the two orthogonal specular surfaces is a non-specular surface.

16. The optical imaging element according to claim 1, wherein the plurality of unit optical elements is arranged in a regular grid shape within the element surface.

17. The optical imaging element according to claim 1, wherein a specular surface of the unit optical element uses a reflection by a flat surface made of a glossy substance.

18. The optical imaging element according to claim 1, wherein a specular surface of the unit optical element is one providing a reflection or a total internal reflection at a flat interface between transparent media having different refractive indices.

19. The optical imaging element according to claim 1, wherein a specular surface of the unit optical element comprises a plurality of unit specular surfaces arranged in a parallel fashion.

20. A display device comprising
a main unit including the optical imaging element according to claim 1 and
an object arranged on an underside of the main unit, wherein
light emitted by the object is transmitted through the optical imaging element, thereby forming and projecting a real image of the object in a space on an upper side of the main unit.

21. The display device according to claim 20, wherein the object comprises a three dimensional actual object or a three dimensional image displayed by a device for displaying images, and a depth thereof in a direction for viewing the real image is inverted in advance.

22. The display device according to claim 20, wherein
the object comprises an actual object having a movement incurred automatically or by an external force, and
the display device projects a moving floating image, as a real image of the actual object, in a space on an upper side of the main unit.

* * * * *